United States Patent [19]

Straub

[11] 4,036,206
[45] July 19, 1977

[54] SELECTIVE SOLAR ENERGY ABSORPTION

[75] Inventor: John Frederick Straub, Aston, Pa.

[73] Assignee: E. I. Du Pont de Nemours and Company, Wilmington, Del.

[21] Appl. No.: 710,096

[22] Filed: July 30, 1976

[51] Int. Cl.² .......................... F24J 3/02; C25D 3/56; C25D 5/48; B23P 3/00
[52] U.S. Cl. .............................. 126/270; 204/35 R; 204/44; 428/687; 428/935
[58] Field of Search ............... 204/44, 35 R; 126/270; 29/199, 196.5

[56] References Cited

U.S. PATENT DOCUMENTS

| | | | |
|---|---|---|---|
| 2,817,627 | 12/1957 | Ostrow | 204/44 |
| 3,920,413 | 11/1975 | Lowery | 126/270 X |

OTHER PUBLICATIONS

R. E. Svadlenak, Plating, pp. 565–568, June 1974.

Primary Examiner—G. L. Kaplan

[57] ABSTRACT

Superior solar energy absorption selectivity is found with blackened white brass electroplated surfaces in which the white brass contains 0.5 to 20% by weight copper, balanced zinc, which has been electroplated using certain brighteners such as 1-benzl pyridinium, 3-carboxylate and then blackened with a weak solution of nitric acid.

10 Claims, No Drawings

SELECTIVE SOLAR ENERGY ABSORPTION

BACKGROUND OF THE INVENTION

This invention concerns the collection of solar energy using a particular type of electroplated and treated surface.

Although most black surfaces are efficient absorbers of solar radiation, many such as ordinary black paints are also efficient radiant emitters of thermal energy at temperatures to which they might be heated by solar absorption such as 90° to 250° C. The net result is that much of the energy absorbed is lost as heat radiated back out into the atmosphere. It is desirable to have a surface which will absorb a maximum of solar radiation in the visible, ultraviolet and infrared portions of the spectrum and emit a minimum of radiation at the temperature of the surface under black body conditions, which would be mainly infrared radiation.

Solar energy absorbers can be used in many types of heat exchange devices. A typical device would involve passing the solar radiation through two transparent windows with a dead air space between and then absorbing it on a black surface of a flat piece of metal, known as a flat plate collector. Water conduits would be built into or attached to the back of the piece of metal, with insulation behind the conduits. The conduits would take the heated water to a location where the heat could be extracted, permitting recirculation of the water. The insulation minimizes heat loss out the back of the device. The double window minimizes conductive heat loss through the window following convective heat transfer by air in the device from the absorber to the window.

The final substantial cause of heat loss in such a device is thermal radiation from the absorber through the double window. While windows can be provided which are more transparent to incoming solar energy than to outgoing thermal energy, such as with interference filters, it is desirable to have available an absorber with substantial solar selectivity.

Solar selective coatings are known. Some of them are produced entirely by electroplating, which can have the disadvantage of uneven plating from one part of the surface to another. Others are more expensive or complicated in their preparation than desirable.

Aside from solar selectivity, it is known that black coatings can be produced by electroplating of several metals for decorative purposes or to minimize glare, such as on weapons. Black chromium and black nickel electroplates are known. A white brass electroplate blackened by dipping in weak nitric acid is taught in Canadian Pat. No. 444,509 — Byers (1949) and by B. Pushpavanam et al. in "Black Finishes on Zinc", *Electroplating and Metal Finishing*, December, 1974, p. 9, 11; and it is known that copper-contaminated zinc electroplates are susceptible to blackening by nitric acid. The original white brass electroplating patent, U.S. Pat. No. 2,221,562 — Wernlund (1940) teaches the production of white brass containing 19 to 31% copper, balance zinc.

However, solar selectivity of blackened white brass is not gnerally known.

SUMMARY OF THE INVENTION

Briefly stated, the present invention provides a process and apparatus for the selective absorption of solar enregy wherein the ratio at about 120° C (250° F) of absorptivity of the surface for solar energy $\alpha_S$, to black body radiation emissivity, $\epsilon_B$, of the surface with respect to heat energy is at least 5:1, the improvement comprising absorbing the solar energy on a blackened white brass electroplated surface in which the electroplate contains about 0.5 to 20% by weight copper, balance zinc, and which electroplate has been prepared by the electrolytic deposition of bright white brass from an alkaline cyanide bath containing dissolved therein zinc, copper, cyanide and, in an amount to yield a metal deposit of improved brightness, at least one brightener which is an inner salt of a quaternized pyridine carboxylic acid having the general formula:

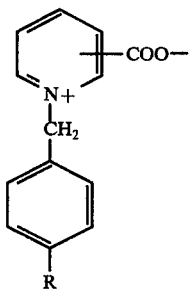

wherein R is —H or —CH$_2$—N+ 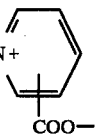

and which bright white brass electroplate has been blackened by contact with an oxidizing acid solution containing 0.1% to 10% by weight nitric acid.

Percentages and proportions herein are by weight, except where indicated otherwise.

Preferably the electroplate contains 1 to 15% copper, balance zinc, and the brightener is 1-benzyl pyridinium, 3-carboxylate present in the electroplating bath in an amount of about 0.01 to 10 g/l. The other preferred brightener of the general formula above is p-xylene bis(pyridinium 3-carboxylate). As is known in the art, the brightener can be provided as an alkali metal salt, such as the sodium salt, which ionizes in solution to give, for instance, 1-benzyl pyridinium, 3-carboxylate.

The electroplating bath can also contain aldehyde brighteners, and the blackening can be done in an oxidizing solution which also contains the Cr$^{VI}$ ion.

DETAILED DESCRIPTION

A useful summary and guide to white brass electroplating is presented by R. E. Svadlenak in "Decorative White Brass Alloy Plating", *Plating*, June, 1974, p. 565. This article also describes the ready plateability of aluminum with white brass. This is important, since aluminum is a desirable substrate metal for use in solar energy absorbers. See also German published patent application OS 2,226,539 — Rushmere and Svadlenak (1973) which uses brighteners including 1-benzyl pyridinium, 3-carboxylate.

Although white brass electroplates can be made with various copper contents in zinc, including 20 to 30% copper, it has been found that blackened white brass containing less than 20% copper is superior for the purposes of this invention. White brass containing 1 to 15% copper, balance zinc, is preferred. As is known in the art, the copper content of the white brass plates can be changed by varying the Cu:Zn ratios in the plating bath. Solar selectivity with coatings of the invention increases with aging at room temperature (~22° C) and increases more rapidly with aging at elevated temperatures. However, the initial selectivity is higher with coatings having less copper content, and there is less of an aging effect.

Ratios of $\alpha_S$ to $\epsilon_B$ at 250° C as high as 9.5:1 have been obtained by use of the present invention, and such ratios above 5:1 are indicative of the advantages of the invention.

Particularly useful white-brass electroplating baths and plating conditions include those shown in Table I.

TABLE I

|  | Preferred | | Typical |
| --- | --- | --- | --- |
|  | g/l | oz/gal | g/l |
| NaCN (titratable) | 52.5–150 | 7.0–20.0 | 64 |
| NaOH | 37.5–67.5 | 5.0– 9.0 | 45 |
| Zn (as metal) | 15–52.5 | 2.0– 7.0 | 21 |
| Cu (as metal) | 3.75–15 | 0.5– 2.0 | 5.25 |
| Na$_2$CO$_3$ | 30–90 | 4.0–12.0 | 37.5 |
| Sodium polysulfide | (trace) | | (trace) |
| Sodium salt of 1-benzyl-pyridinium 3-carboxylate | 1.4–4.2 | 0.19–1.1 | 2.8 |
| | A/m$^2$ | A/ft$^2$ | A/m$^2$ |
| Anode current density | 50–150 | 5–15 | 50 |
| Cathode current density | 50–1000 | 5–100 | 100 |
| Bath temperature | 15–38° C | 60–100° F | 27° C |

Satisfactory blackening of white brass for the purposes of the invention has not been found without the brighteners of the invention. Other known brighteners for zinc electroplating, i.e., polyethyleneimine and polyvinyl alcohol, have been found to give dull white brass electroplates which do not blacken satisfactorily.

The electroplating solution is normally filtered through activated carbon, and either the solution or the cathode is agitated. Although greater or lesser times can be used, desirable plating times are in the range of 5 to 30 minutes. A suitable plate thickness is 0.006 mm.

Known techniques for electroplating white brass on aluminum include but are not limited to alkaline cleaning followed by dipping in 50% nitric acid to remove smut, water rinsing, then plating in a cyanide bath, such as the typical bath described above.

Pretreatments between bright electroplating and the nitric acid dip which develops the black color can be used, although mere water rinsing is generally adequate.

For blackening, the coated article is immersed in a weak nitric acid solution containing at least about 0.1% nitric acid and up to 10% acidic acid, preferably 0.7 to 1.0% nitric acid. The pH is preferably in the range of 1.0 to 3.5, more preferably 1.0 to 1.2.

The immersion is preferably at 15° to 50° C for 3 seconds to 4 minutes. Ambient temperatures of 15° to 32° C seem optimum, but temperatures up to 50° C or higher can be used. Immersion times of 0.5 to 1.0 minute are generally used. As operation temperatures increase, preferred bath strengths and immersion times decrease.

The nitric acid immersion bath can be prepared by adding the appropriate amounts of 42° Baume nitric acid to water in a suitable container with stirring. It is desirable to avoid the presence of unnecessary ions that might result in troublesome interference. Tanks made of rigid polyvinyl chloride, polyethylene, polypropylene, or steel tanks lined with such plastics are suitable. Further additions of 42° nitric acid can be made to compensate for drag out and consumption of the acid, controlling the pH to the selected level. When the pH is at the desired level, if the white brass alloy plate fails to develop the desired black color, the problem normally will be contamination by interfering ions, and a new nitric acid bath should be used. Although certain extraneous ions can interfere with blackening, others such as Cr$^{VI}$ in chromate conversion treatments can be compatible with blackening.

EXAMPLE I

Test panels of mild steel were electroplated with 0.006 mm of white brass alloy using techniques described above as typical to give a plate containing about 20% Cu, balance Zn.

The panels were then dipped into a stirred nitric acid solution at pH 1.0 and 21° C for about 1 minute. The treated panels were rinsed in cold running water for 30 seconds and air dried. The ratio of $\alpha_S/\epsilon_B$ at about 120° C was measured as 9.5, showing very good solar selectivity.

EXAMPLE II

Test panels plated as in Example I were satisfactorily blackened with a chromate conversion coating using weak nitric acid by dipping in an aqueous solution of:

| HNO$_3$ (42° Bé) | 7 ml/l, (0.985%) |
| --- | --- |
| NaF | 4.5 g/l |
| K$_2$Cr$_2$O$_7$ | 1.65 g/l |
| NaHSO$_3$ | 1.35 g/l |

EXAMPLE III

Blackened samples were made as in Example I with various copper contents in the plate.

Samples with about 20% copper blackened satisfactorily.

Samples with 10.6% and 12% copper had considerably higher $\alpha_S$ and lower $\epsilon_B$ than samples with 23% copper. Also, the 10.6% and 12% copper samples exhibited less change in $\alpha_S$ and $\epsilon_B$ on aging than did those with 23% copper. Aging in air of samples made according to the invention for 6 days at room temperature or for an hour or more at 250° C, for instance, is useful in lowering $\epsilon_B$.

EXAMPLE IV

Samples containing 18 to 20% copper in the plate were made by electroplating with the baths described in Table II and dipping in 0.25% and 1.0% nitric acid as in Example I or the chromate conversion coating of Example II.

TABLE II

| | Bath I | | Bath II | |
| --- | --- | --- | --- | --- |
| | g/l | oz/gal | g/l | oz/gal |
| NaCN (titratable) | 147.8 | 19.7 | 61.5 | 8.2 |
| NaOH | 60.0 | 8.0 | 45.0 | 6.0 |
| Zn (as metal) | 50.25 | 6.7 | 21.0 | 2.8 |
| Cu (as metal) | 12.0 | 1.6 | 5.25 | 0.7 |
| Na$_2$CO$_3$ | 37.5 | 5.0 | 37.5 | 5.0 |
| Sodium polysulfide | (trace) | | (trace) | |
| Brighteners | (variable) | | (variable) | |

Samples were plated in baths containing dissolved 1-benzyl pyridinium, 3-carboxylate brightener at concentrations of 0.97, 1.39, 2.08, 2.77 and 4.16 g/l.

Various depths of dark color approximating black, with and without irridescence, were obtained on all of the blackened samples which were plated with the brightener. Those plated without any brightener gave only a copper-tone color upon attempts to blacken them, and they were unsatisfactory for solar selective applications.

EXAMPLE V

Samples were plated with Bath II of Example IV, with and without 1-benzyl pyridinium, 3-carboxylate (BPC) and with and without bisulfated veratraldehyde, also known as dimethoxy benzaldehyde bisulfate, to determine the effect of the latter on brightening and blackening. The samples were Hull cell panels, plated for 5 minutes at 2 amps at ambient temperatures. After plating, the samples were dipped in a 1% nitric acid solution made by diluting 5 ml of 42° Baumé $HNO_3$ to 500 ml with distilled water. The results are shown in Table III.

TABLE III

| Sample | Brightener (g/l) Veratraldehyde | BPC | Plating Results | Blackening Time and Results |
|---|---|---|---|---|
| 1 | 0.75 | — | semi-bright | (30 sec) light gray |
| 2 | 0.75 | 1.39 | bright | (10 sec) black |
| 3 | — | 2.08 | bright, some haze below 100 A/m² | (5 sec) black |

These results showed that aldehyde brighteners can be used successfully with the required brighteners of the invention, but not alone.

I claim:

1. In a process for the selective absorption of solar energy wherein the ratio at 120° C (250° F) of absorptivity of the surface for solar energy, $\alpha_S$, to black body radiation emissivity, $\epsilon_B$, of the surface with respect to heat energy is at least 5:1, the improvement comprising absorbing the solar energy on a blackened white brass electroplated surface in which the electroplate contains about 0.5 to 20% by weight copper, balance zinc, and which electroplate has been prepared by the electrolytic deposition of bright white brass from an alkaline cyanide electroplating bath containing dissolved therein zinc, copper, cyanide and, in an amount to yield a metal deposit of improved brightness, at least one brightener which is an inner salt of a quaternized pyridine carboxylic acid having the general formula:

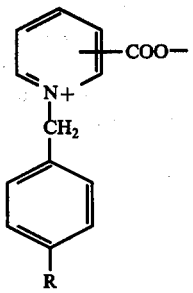

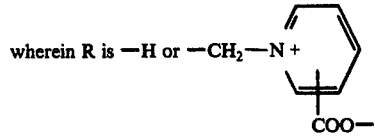

wherein R is —H or —$CH_2$—N+ and which bright white brass electroplate has been blackened by contact with an oxidizing acid solution containing 0.1% to 10% by weight nitric acid.

2. The improvement of claim 1 wherein the electroplate contains about 1 to 15% by weight copper, balance zinc.

3. The improvement of claim 1 wherein the brightener is 1-benzyl pyridinium, 3-carboxylate and it is present in the electroplating bath in an amount of about 0.01 to 10 g/l.

4. The improvement of claim 1 wherein said electroplating bath also contains an aldehyde brightener.

5. The improvement of claim 1 wherein said oxidizing acid solution also contains the $Cr^{VI}$ ion.

6. An apparatus for the selective absorption of solar energy wherein the ratio at 120° C (250° F) of absorptivity of the surface for solar energy, $\alpha_S$, to black body radiation emissivity, $\epsilon_B$, of the surface with respect to heat energy is at least 5:1, the improvement comprising
    the absorber on which the solar energy is absorbed being a blackened white brass electroplated surface in which the electroplate contains about 0.5 to 20% by weight copper, balance zinc, and which electroplate has been prepared by the electrolytic deposition of bright white brass from an alkaline cyanide electroplating bath containing dissolved therein zinc, copper, cyanide, and in an amount to yield a metal deposit of improved brightness, at least one brightener which is an inner salt of a quaternized pyridine carboxylic acid having the general formula:

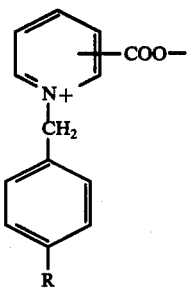

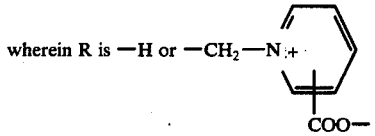

wherein R is —H or —$CH_2$—N+ and which bright white brass electroplate has been blackened by contact with an oxidizing acid solution containing 0.1% to 10% by weight nitric acid.

7. The improvement of claim 6 wherein the electroplate contains about 1 to 15% by weight copper, balance zinc.

8. The improvement of claim 6 wherein the brightener is 1-benzyl pyridinium, 3-carboxylate, and it is present in the electroplating bath in an amount of about 0.1 to 10 g/l.

9. The improvement of claim 6 wherein said oxidizing acid solution also contains the $Cr^{VI}$ ion.

10. The improvement of claim 6 wherein said electroplating bath also contains an aldehyde brightener.

* * * * *